(12) United States Patent
Lim et al.

(10) Patent No.: US 7,412,115 B2
(45) Date of Patent: Aug. 12, 2008

(54) IMAGE PROCESSING DEVICE AND METHOD THEREOF

(75) Inventors: Hwa-sup Lim, State College, PA (US); Young-ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 654 days.

(21) Appl. No.: 10/962,900

(22) Filed: Oct. 13, 2004

(65) Prior Publication Data

US 2005/0105825 A1   May 19, 2005

(30) Foreign Application Priority Data

Nov. 18, 2003  (KR) ...................... 10-2003-0081522

(51) Int. Cl.
  *G06K 9/32* (2006.01)
  *G06K 9/36* (2006.01)
  *G06F 17/00* (2006.01)
(52) U.S. Cl. ...................................... 382/300; 382/285
(58) Field of Classification Search ................ 382/285, 382/284, 276, 294, 300; 345/418, 419, 420, 345/422, 424, 427; 358/525, 540, 450
See application file for complete search history.

(56) References Cited

U.S. PATENT DOCUMENTS 6,771,264 B1 *  8/2004  Duluk et al. ................. 345/426
7,236,167 B2 *  6/2007  Lee et al. .................... 345/420

FOREIGN PATENT DOCUMENTS

| JP | 08-329253 | 12/1996 |
|---|---|---|
| JP | 09-200575 | 7/1997 |
| JP | 09-265527 | 10/1997 |
| KR | 2002-57526 | 7/2002 |

\* cited by examiner

*Primary Examiner*—Yon Couso
(74) *Attorney, Agent, or Firm*—Stanzione & Kim, LLP

(57) ABSTRACT

An image processing device and a method thereof. The image processing device includes a mapper to map a two-dimensional plane of an input image into a three-dimensional vector surface, a coefficient calculator to calculate a coefficient with respect to an equation of a plane formed by a plurality of pixels mapped by the mapper, and an interpolator to interpolate by calculating a gray-level of a location to be interpolated based on the equation of the plane obtained by the coefficient calculator. When the pixels on the 2-D plane are mapped into the 3-D vector space, the image processing device according to an exemplary embodiment of the present general inventive concept prevents overshoot or undershoot which may occur at the edges or on planes, and thus displays a smooth image.

15 Claims, 8 Drawing Sheets

Replication

Bi-cubic

Vector Scaling
+Direction

IMAGE PROCESSING DEVICE AND METHOD THEREOF

CROSS-REFERENCE TO RELATED APPLICATIONS

This application claims the benefit of Korean Patent Application No. 2003-81522 filed on Nov. 18, 2003 in the Korean Intellectual Property Office, the disclosure of which is incorporated herein by reference and in its entirety.

BACKGROUND OF THE INVENTION

1. Field of the Invention

The present general inventive concept generally relates to an image processing device and a method thereof. More specifically, the present general inventive concept relates to an image processing device capable of resizing an input image without incurring image deterioration at edges, and a method thereof.

2. Description of the Related Art

An image signal input to a display carries a limited amount of information. When an image, which is the collection of such image signals, is resized according to a size of the display or according to a user's desired size, the image on the display may be distorted. For example, if the input image is enlarged twice, each source data is mapped into a destination data of the enlarged image as shown in FIG. 1. Specifically, the source data A of coordinates (0, 0) is mapped to the destination data of coordinates (0, 0), the source data B of coordinates (0, 1) is mapped to the destination data of coordinates (0, 2), the source data C of coordinates (1, 0) is mapped to the destination data of coordinates (2, 0), and the source data D of coordinates (1, 1) is mapped to the destination data of coordinates (2, 2). The source data A, B, C and D represent pixel values, respectively. The destination data of coordinates (0, 1), (0, 3), (1, 0), (1, 1), (1, 2), (1, 3), (2, 1), (2, 3), (3, 0), (3, 1), (3, 2) and (3, 3) remain empty without being mapped to the source data, which causes distortion of the image signal.

Interpolation technology is required to address the above drawbacks. The interpolation re-samples the image data to determine values between defined pixels. That is, the interpolation creates values between the pixels when enlarging the image signal. Frequently used interpolation algorithms include a nearest neighbor pixel interpolation, a bilinear interpolation, and a cubic convolution interpolation.

The nearest neighbor pixel interpolation outputs values between pixels by selecting values of the nearest neighbor pixels as shown in FIG. 2. This interpolation does not deteriorate the original image data, but may introduce errors of $1/\sqrt{2}$ in maximum and coarse image since output pixels are obtained from the collection of input pixels without generating new data.

The bilinear interpolation outputs values between pixels by selecting a weighted average with respect to distances to four adjacent pixels as shown in FIG. 3. The bilinear interpolation rearranges the pixel values of the interpolated image based on the following equation.

[Equation 1]

$$R=(1-u)(2-v)P_{x,y}+u(1-v)P_{x+1,y}+(1-u)vP_{x,y+1}+uvP_{x+1,y+1}$$

In Equation 1, P indicates a pixel value of the input image signal, and R indicates a pixel value of the interpolated image signal.

The cubic convolution interpolation outputs an interpolated pixel value from the nearest 16 pixel values of the original image surrounding a point to be rearranged, as illustrated in FIG. 4. In a case that a sample data of the original image is $f(x_k)$, a continuous function $\hat{f}(x)$ interpolated from the sample data is expressed as the following equation.

$$\hat{f}(x) = \sum_k c_k \beta(x - x_k) \qquad \text{[Equation 2]}$$

In Equation 2, $\beta(x)$ is a basis function, $c_k$ is a coefficient relating to the pixel value $f(x_k)$, x indicates an interpolation point, and $x_k$ and $x_{k+1}$ indicate pixel locations at a current resolution. The continuous function expressed as Equation 2 may be rearranged to a sin c(x) function for the sake of a more ideal interpolation as the following equation:

$$\hat{f}(x) = \sum_k f(x_k) \sin c(x - x_k). \qquad \text{[Equation 3]}$$

However, it is infeasible to implement substantially because the sin c(x) function is defined in an infinite extent. Thus, the cubic convolution interpolated continuous function is suggested instead of the sin c(x) function.

Relation between an interpolation point x to be interpolated and neighboring sampling points is $s = x - x_k$, and $1 - s = x_{k+1} - x$, where $0 \leq s \leq 1$ and $x_k \leq x \leq x_{k+1}$.

If $\beta(x)$ of Equation 2 is used instead of sin c(x) in Equation 3, finite extent is introduced. That is, a basis kernel function has a valid value in the (−2, 2) region.

$$\beta(x) = \begin{cases} (\alpha+2)|x|^3 - (\alpha+3)|x|^2 + 1 & 0 \leq |x| \leq 1 \\ \alpha|x|^3 - 5\alpha|x|^2 + 8\alpha|x| - 4\alpha & 1 \leq |x| \leq 2 \end{cases} \qquad \text{[Equation 4]}$$

If $\beta(x)$ of Equation 2 substitutes sin c(x) of Equation 3 using the relation between the interpolation point and the sampling points, the cubic convolution interpolated continuous function is expressed as the following equation:

$$\hat{f}(x) = f(x_{k-1})\{\alpha(s^3 - 2s^2 + s)\} + \qquad \text{[Equation 5]}$$
$$f(x_k)\{\alpha(s^3 - s^2) + (2s^3 - 3s^2 + 1)\} +$$
$$f(x_{k+1})\{\alpha(-s^3 + 2s^2 - s) + (-2s^3 + 3s^2)\} +$$
$$f(x_{k+2})\{\alpha(-s^3 + s^2)\}.$$

In equation 5, $\alpha$ is a cubic convolution interpolation coefficient.

The cubic convolution interpolation produces a smoother image than the nearest neighbor pixel interpolation and a sharper image than the bilinear interpolation. However, the cubic convolution interpolation may bring about image overshoot or undershoot. The generated overshoot or undershoot deteriorates the image quality.

SUMMARY OF THE INVENTION

The foregoing and/or other aspects and advantages of the present general inventive concept are achieved by providing an image processing device including a mapper to map a two-dimensional plane of an input image into a three-dimensional vector surface, a coefficient calculator to calculate a coefficient with respect to an equation of a plane formed by a plurality of pixels mapped by the mapper, and an interpolator to interpolate by calculating a gray-level of a location to be interpolated based on the equation of the plane obtained by the coefficient calculator.

Additional aspects and advantages of the present general inventive concept will be set forth in part in the description which follows and, in part, will be obvious from the description, or may be learned by practice of the general inventive concept.

The mapper may include a plane classifier to classify a surface formed by four pixels of the input image into a plane shape orthogonal to the Z-axis, a plane shape inclined to one direction, and a shape where the two planes make contact, and a direction searcher to search an edge direction of the surface formed by the four pixels when the surface formed by the four pixels, which is classified by the plane classifier, is where the two planes make contact. The image is mapped based on the classified shape of the plane classifier and the edge direction searched by the direction searcher.

The coefficient calculator calculates the coefficient based on three coordinates $(x_0, y_0, z_0), (x_1, y_1, z_1), (x_2, y_2, z_2)$ on a same plane in accordance with the following equation of the plane:

$$ax+by+cz=1$$

where a, b, and c are coefficients, and $$a = \frac{|D_x|}{|D|}, b = \frac{|D_y|}{|D|}, c = \frac{|D_z|}{|D|}$$

$$D = \begin{pmatrix} x_0 & y_0 & z_0 \\ x_1 & y_1 & z_1 \\ x_2 & y_2 & z_2 \end{pmatrix}.$$

The interpolator acquires the gray-level based on the coefficients a, b, and c acquired by the coefficient calculator in accordance with the following equation:

$$z = -\frac{a}{c}x - \frac{b}{c}y + \frac{1}{c}.$$

The image processing device further comprises a line memory to form an image laid in a two-dimensional plane by collecting image signals delayed in horizontal and vertical directions.

The image processing device provides an image processing method comprising the operations of mapping a two-dimensional plane of an input image into a three-dimensional vector surface, calculating a coefficient with respect to an equation of a plane formed by a plurality of pixels mapped at the mapping operation, and interpolating by calculating a gray-level of a location to be interpolated based on the equation of the plane.

The image processing method may further comprise the operations of classifying a surface formed by four pixels of the input image into a plane shape orthogonal to the Z-axis, a plane shape inclined to one direction, and a shape where the two planes contact, and searching an edge direction of the surface formed by the four pixels when the surface formed by the four pixels, which is classified at the searching operation, is where the two planes make contact. The mapping operation maps the image based on the classified shape of the classifying operation and the edge direction of the classifying operation.

The classifying a coefficient operation calculates the coefficient based on three coordinates $(x_0, y_0, z_0), (x_1, y_1, z_1), (x_2, y_2, z_2)$ on a same plane in accordance with the following equation of the plane:

$$ax+by+cz=1$$

where a, b, and c are coefficients, and $$a = \frac{|D_x|}{|D|}, b = \frac{|D_y|}{|D|}, c = \frac{|D_z|}{|D|}$$

$$D = \begin{pmatrix} x_0 & y_0 & z_0 \\ x_1 & y_1 & z_1 \\ x_2 & y_2 & z_2 \end{pmatrix}.$$

The interpolating operation acquires the gray-level based on the coefficients a, b, and c acquired at the calculating coefficient operation in accordance with the following equation:

$$z = -\frac{a}{c}x - \frac{b}{c}y + \frac{1}{c}.$$

A computer-readable recording medium containing code providing an image processing method comprises the operations of mapping a two-dimensional plane of an input image into a three-dimensional vector surface, calculating a coefficient with respect to an equation of a plane formed by a plurality of pixels mapped at the mapping operation, and interpolating by calculating a gray-level of a location to be interpolated based on the equation of the plane.

Therefore, the image processing device can resize the image with simplicity without causing image overshoot or undershoot.

BRIEF DESCRIPTION OF THE DRAWINGS

These and/or other aspects and advantages of the general inventive concept will become apparent and more readily appreciated from the following description of exemplary embodiments, taken in conjunction with the accompanying drawing figures of which.

DETAILED DESCRIPTION OF THE PREFERRED EMBODIMENTS

Figure 1:
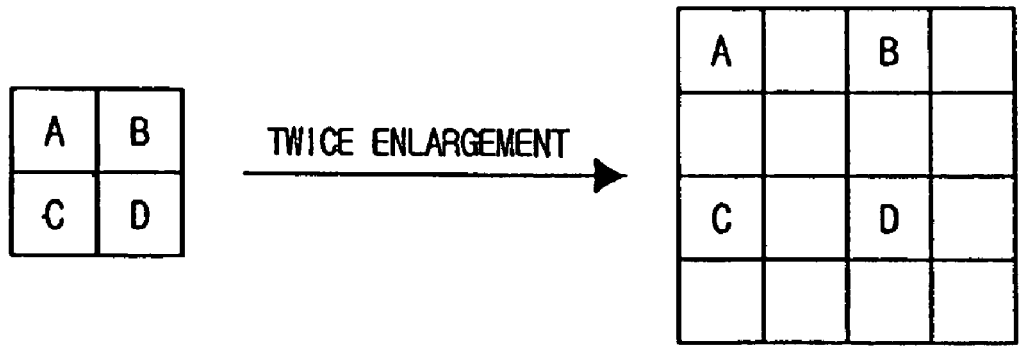
FIG. 1 is a diagram illustrating a source data mapping when enlarging an image.
Figure 2:
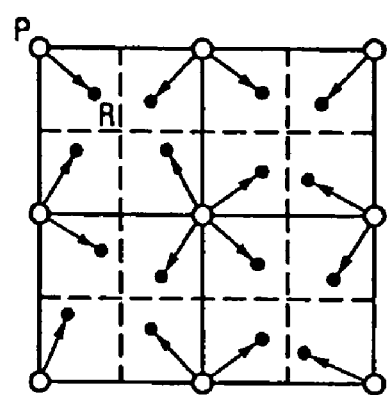
FIG. 2 is a diagram illustrating a nearest neighbor pixel interpolation.
Figure 3:
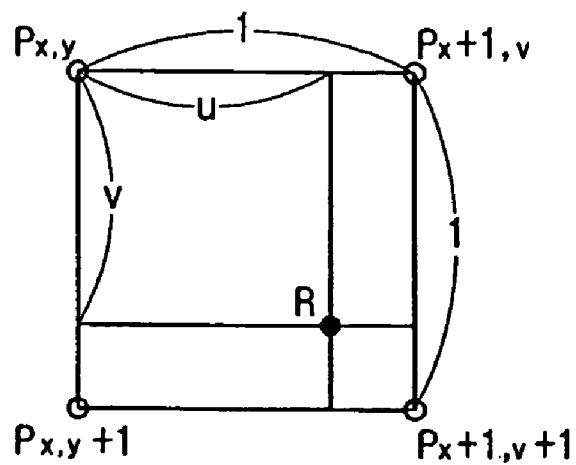
FIG. 3 is a diagram illustrating a bilinear interpolation.
Figure 4:
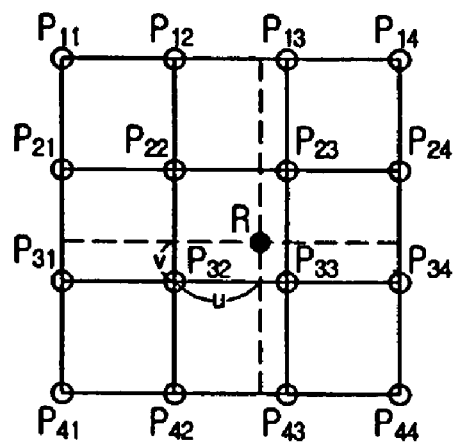
FIG. 4 is a diagram illustrating a cubic convolution interpolation.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the drawings.

Figure 5:
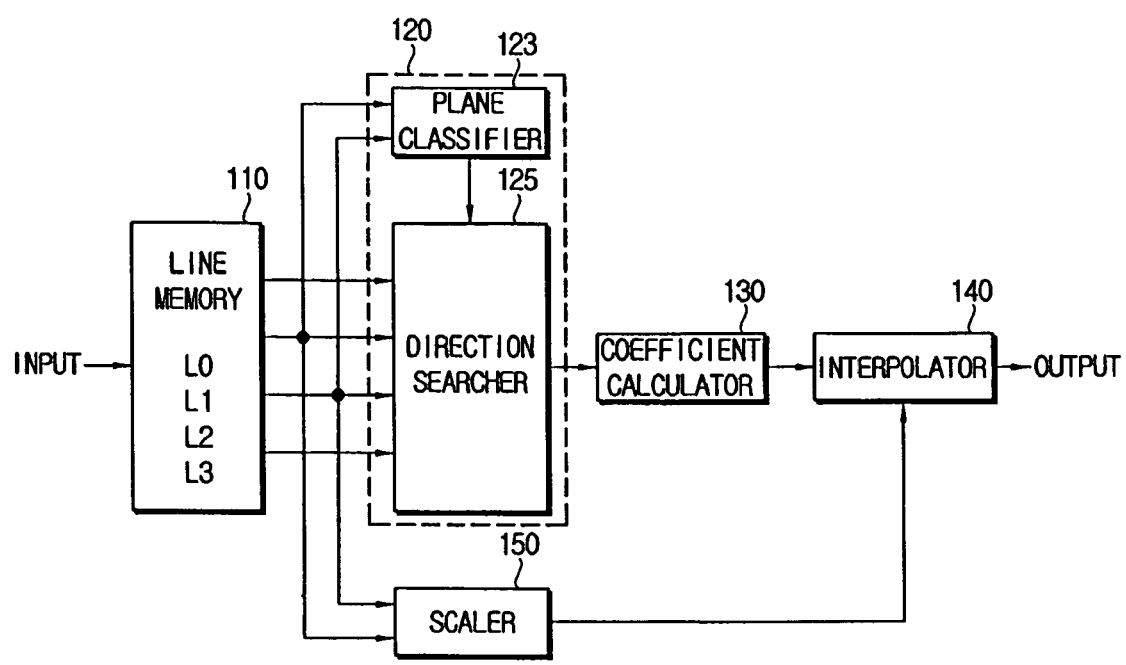
FIG. 5 is a block diagram of an image processing device according to an exemplary embodiment of the present general inventive concept.

FIG. 5 is a block diagram of an image processing device according to an exemplary embodiment of the present general inventive concept. Referring now to FIG. 5, the image processing device includes a line memory 110, a mapper 120, a coefficient calculator 130, an interpolator 140, and a scaler 150. The mapper 120 includes a plane classifier 123 and a direction searcher 125.

Figure 6:
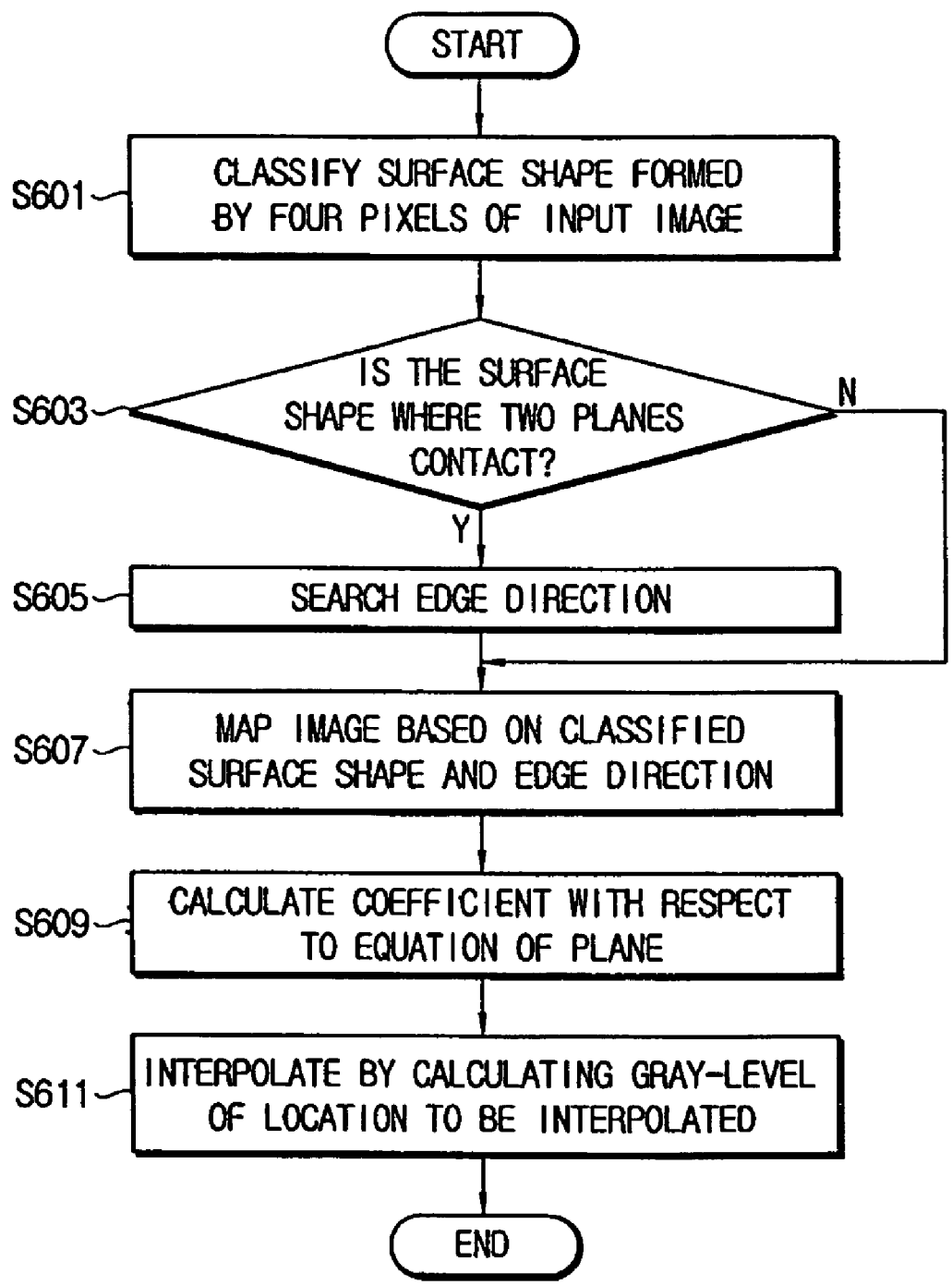
FIG. 6 is a flowchart of image processing operation according to an exemplary embodiment of the present general inventive concept.

FIG. 6 is a flowchart of image processing operations of the image processing device of FIG. 5, which is described in detail below.

The line memory 110 makes up a horizontal row by delaying input image signals in sequence, and makes up a column of a matrix form by delaying the lined image signals in a vertical direction in sequence. Hence, an image is formed from the collection of the image signals delayed in the horizontal and vertical directions. The image formed by the line memory 110 is laid on a 2-dimensional (2-D) plane.

Figure 7:
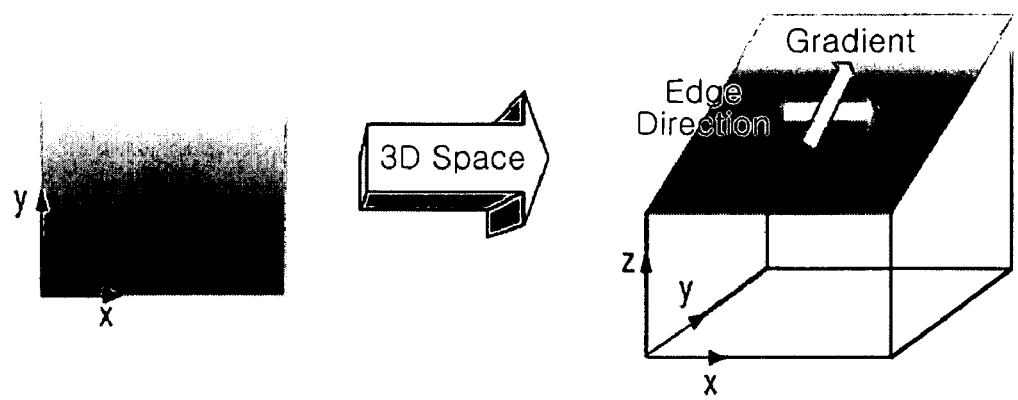
FIG. 7 is a diagram illustrating an edge direction and a gradient when mapping a 2-dimensional plane into a 3-dimensional space.

The plane classifier 123 of the mapper 120 classifies the 2-D plane of the input image into a plane shape which is orthogonal to a Z-axis with respect to a surface formed by four pixels, a plane shape inclined to one direction, and a shape where two planes are in contact, at operation S601. Referring to FIG. 7, when the 2-D plane of the image is mapped to a 3-D space, such a plane classification has an edge direction according to a level of intensity and a gradient which is orthogonal to the edge direction. Advantageously, the four pixels of the input image are set to four neighboring pixels for the sake of accurate shape classification. The four pixels are not limited to this example and it is possible to use pixels at different locations.

Figure 8:
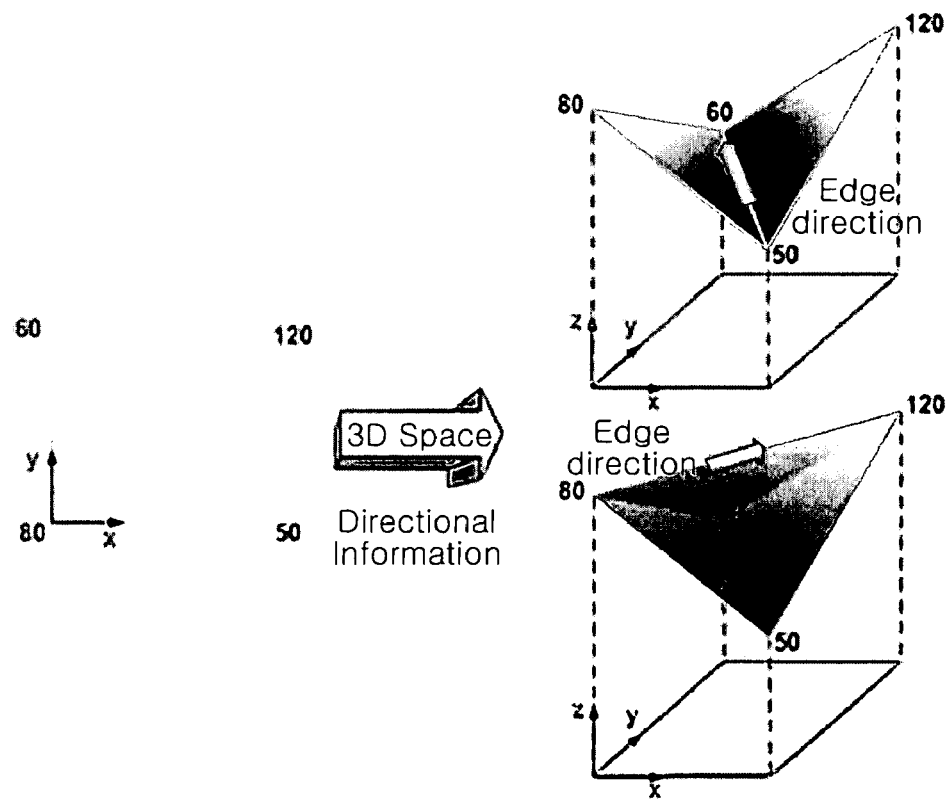
FIG. 8 is a diagram illustrating when two planes are in contact when mapping the 2-D plane into the 3-D space.
Figure 9:
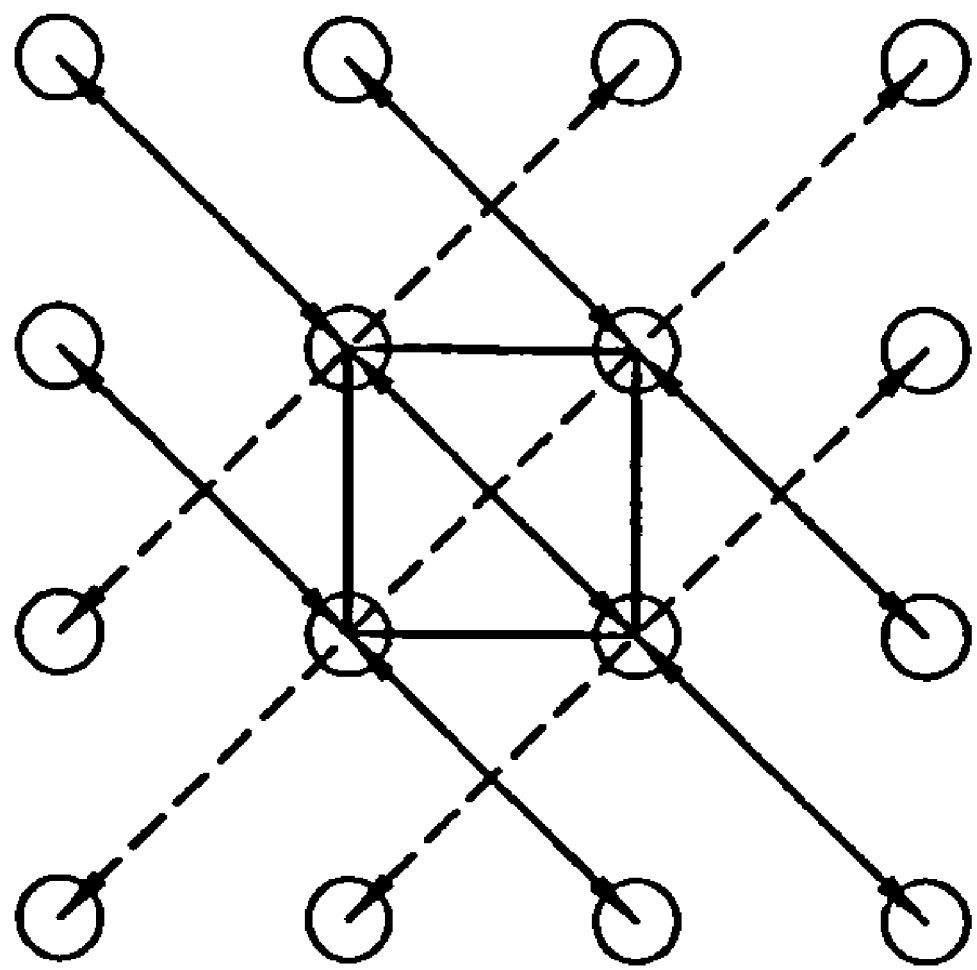
FIG. 9 is a diagram illustrating a search of a edge direction.

If the surface formed by the four pixels, which is classified by the plane classifier 123, is where the two planes contact at operation S603, the direction searcher 125 of the mapper 120 searches the edge direction of the surface formed by the four pixels at operation S605. Specifically, if four pixels on the 2-D plane is mapped into the 3-D space, the four pixels are mapped to a plane shape orthogonal to the Z-axis, a plane shape inclined to one direction, or a shape where two planes are in contact as shown in FIG. 8. Referring to FIG. 8, numbers at each vertex of the 2-D plane indicate an intensity level of each pixel. If the four pixels on the 2-D plane are mapped to the shape where the two planes make contact on the 3-D space, the edge direction may vary according to the shape. The direction searcher 125 obtains the edge direction by connecting adjacent pixels having a level similar to the input pixel. It is advantageous that the direction searcher 125 searches with respect to one direction a difference of pixel values on a line connecting the adjacent pixels of the level similar to the input pixel, and then searches with respect to the other direction in the same manner.

The mapper 120 maps the image based on the shape classified by the plane classifier 123 and the edge direction searched by the direction searcher 125 at operation S607. In detail, after the plane classifier 123 classifies the surface shape and the direction searcher 125 searches the edge direction, the mapper 125 maps the individual pixels of the 2-D plane into the 3-D space based on the surface shape and the edge direction.

Figure 10:
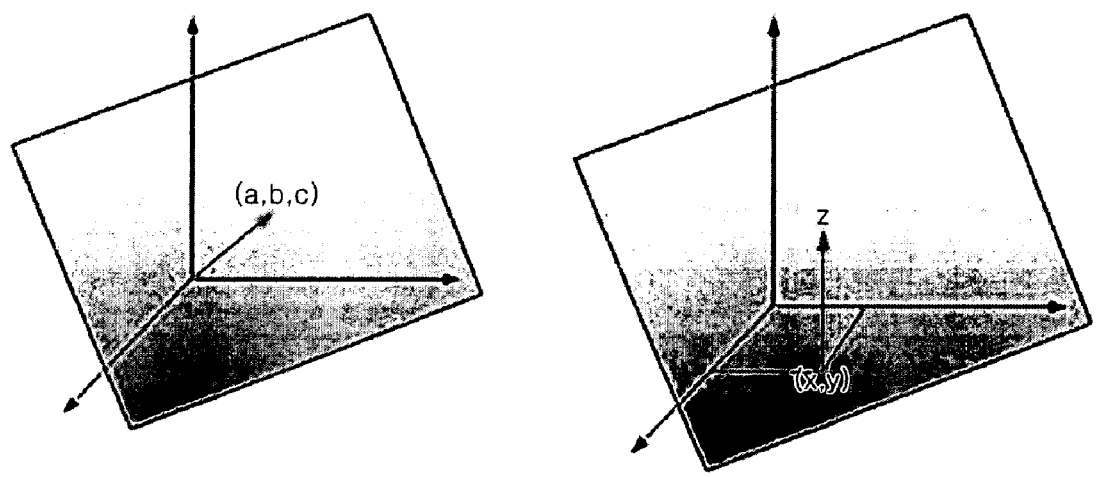
FIG. 10 is a diagram illustrating where a coefficient with respect to the equation of the plane and a gray-level are calculated.

The coefficient calculator 130 calculates a coefficient with respect to an equation of the surface formed by the individual pixels mapped into the 3-D space by the mapper 120 at operation S609. Referring to FIG. 10, in a case that a normal vector with respect to the plane formed by each of the mapped pixels is (a, b, c), the equation of the plane is expressed as below.

[Equation 6]

$$ax+by+cz=1$$

If a certain three points $(x_0, y_0, z_0)$, $(x_1, y_1, z_1)$, $(x_2, y_2, z_2)$ are substituted into Equation 6, the following equation is introduced.

[Equation 7]

$$ax_0+by_0+cz_0=1$$

$$ax_1+by_1+cz_1=1$$

$$ax_2+by_2+cz_2=1$$

Each coefficient a, b, c is calculated according to Cramer's rule in accordance with Equation 7, which is:

$$a = \frac{|D_x|}{|D|}, b = \frac{|D_y|}{|D|}, c = \frac{|D_z|}{|D|}, \text{ and}$$

$$D = \begin{pmatrix} x_0 & y_0 & z_0 \\ x_1 & y_1 & z_1 \\ x_2 & y_2 & z_2 \end{pmatrix}$$

The plane classifier 123 of the mapper 120 detects a singular value which makes D=0, and the equation of the surface is acquired by applying other equations, for example, cz=1, ax+cz=1, or by+bz=1.

When the coefficients a, b, c are acquired by the coefficient calculator 130, the interpolator 140 interpolates a gray-level of the mapped pixels by calculating the gray-level of the location to be interpolated from the equations of the planes applying the individual coefficients at operation S611. In FIG. 10, since the z value indicates the gray-level with respect to the equation of the plane in the mapped 3-D space, the interpolator 140 acquires the gray-level based on the following equation.

$$z = -\frac{a}{c}x - \frac{b}{c}y + \frac{1}{c}$$ [Equation 8]

Figure 11:
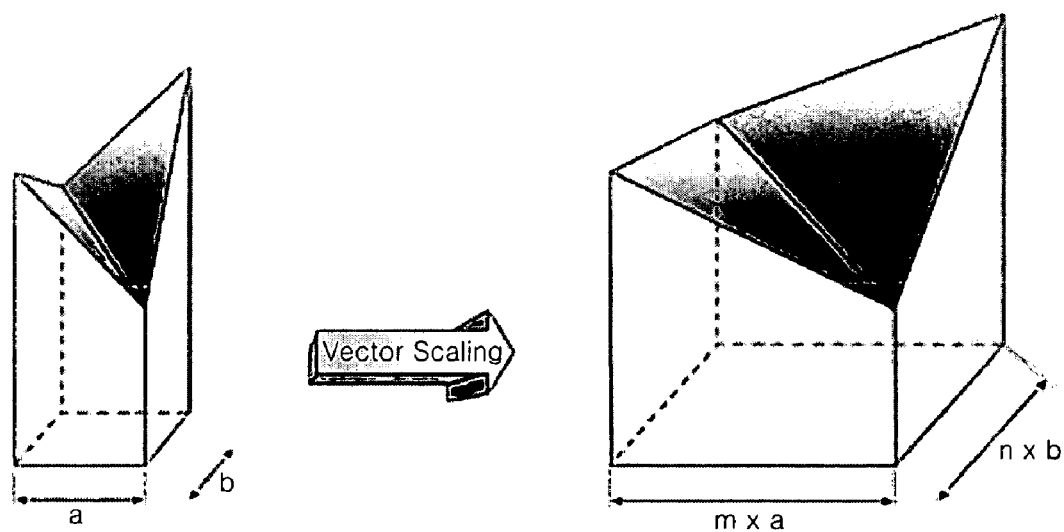
FIG. 11 is an enlarged diagram of FIG. 8.

If the surface mapped into the 3-D space is enlarged by the scaler 150 as shown in FIG. 11, the interpolator 140 interpolates the image by filling an empty location with the gray-level of the location corresponding to the pixel to be interpolated.

Figure 12:
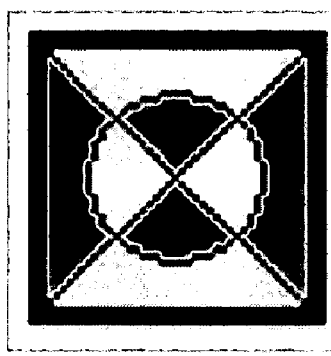
FIG. 12 is a diagram illustrating an example of a processed image according to an exemplary embodiment of the present general inventive concept.
Figure 12:
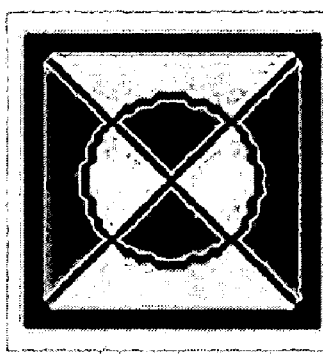
Figure 12:
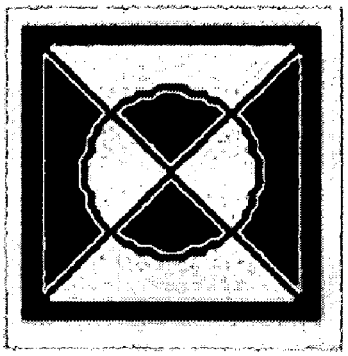

When the pixels on the 2-D plane are mapped into the 3-D vector space, the image processing device according to an exemplary embodiment of the present general inventive concept prevents overshoot or undershoot which may occur at the edges or on planes, and thus displays the smooth image as shown in FIG. 12.

The present general inventive concept can be realized as a method, an apparatus, and a system. When the present general inventive concept is manifested in computer software, components of the present general inventive concept may be replaced with code segments that are necessary to perform the required action. Programs or code segments may be stored in media readable by a processor, and transmitted as computer data that is combined with carrier waves via a transmission media or a communication network.

The media readable by a processor include anything that can store and transmit information, such as, electronic circuits, semiconductor memory devices, ROM, flash memory, EEPROM, floppy discs, optical discs, hard discs, optical fiber, radio frequency (RF) networks, etc. The computer data also includes any data that can be transmitted via an electric network channel, optical fiber, air, electromagnetic field, RF network, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing device comprising:
    a mapper to map a two-dimensional plane of an input image into a three-dimensional vector surface;
    a coefficient calculator to calculate a coefficient with respect to an equation of a plane formed by a plurality of pixels mapped by the mapper; and
    an interpolator to interpolate by calculating a gray-level of a location to be interpolated based on the equation of the plane obtained by the coefficient calculator.

2. The image processing device of claim 1, wherein the mapper comprises:
    a plane classifier to classify a surface formed by four pixels of the input image into a plane shape orthogonal to the Z-axis, a plane shape inclined to one direction, and a shape where the two planes contact; and
    a direction searcher to search an edge direction of the surface formed by the four pixels when the surface formed by the four pixels, which is classified by the plane classifier, is where the two planes contact, and the image is mapped based on the classified shape of the plane classifier and the edge direction searched by the direction searcher.

3. The image processing device of claim 2, wherein the coefficient calculator calculates the coefficient based on three coordinates $(x_0, y_0, z_0)$, $(x_1, y_1, z_1)$, $(x_2, y_2, z_2)$ on a same plane in accordance with the following equation of the plane:

$$ax+by+cz=1$$

where a, b, and c are coefficients, and $$a = \frac{|D_x|}{|D|}, b = \frac{|D_y|}{|D|}, c = \frac{|D_z|}{|D|}$$

$$D = \begin{pmatrix} x_0 & y_0 & z_0 \\ x_1 & y_1 & z_1 \\ x_2 & y_2 & z_2 \end{pmatrix}.$$

4. The image processing device of claim 3, wherein the interpolator acquires the gray-level based on the coefficients a, b, and c acquired by the coefficient calculator in accordance with the following equation:

$$z = -\frac{a}{c}x - \frac{b}{c}y + \frac{1}{c}.$$

5. The image processing device of claim 1, further comprising a line memory to form an image laid in a two-dimensional plane by collecting image signals delayed in horizontal and vertical directions.

6. An image processing method comprising the operations of:
    mapping a two-dimensional plane of an input image into a three-dimensional vector surface;
    calculating a coefficient with respect to an equation of a plane formed by a plurality of pixels mapped in the mapping operation; and
    interpolating by calculating a gray-level of a location to be interpolated based on the equation of the plane.

7. The image processing method of claim 6, further comprising the operations of:
    classifying a surface formed by four pixels of the input image into a plane shape orthogonal to the Z-axis, a plane shape inclined to one direction, and a shape where the two planes make contact; and
    searching an edge direction of the surface formed by the four pixels when the surface formed by the four pixels, which is classified at the classifying operation, is where the two planes make contact, and
    the mapping operation maps the image based on the classified shape of the classifying operation and the edge direction of the searching an edge direction operation.

8. The image processing method of claim 7, wherein the calculating a coefficient operation calculates the coefficient based on three coordinates $(x_0, y_0, z_0)$, $(x_1, y_1, z_1)$, $(x_2, y_2, z_2)$ on a same plane in accordance with the following equation of the plane:

$$ax+by+cz=1$$

where a, b, and c are coefficients, and $$a = \frac{|D_x|}{|D|}, b = \frac{|D_y|}{|D|}, c = \frac{|D_z|}{|D|}$$

$$D = \begin{pmatrix} x_0 & y_0 & z_0 \\ x_1 & y_1 & z_1 \\ x_2 & y_2 & z_2 \end{pmatrix}.$$

9. The image processing method of claim 8, wherein the interpolating operation acquires the gray-level based on the coefficients a, b, and c acquired at the calculating a coefficient operation in accordance with the following equation:

$$z = -\frac{a}{c}x - \frac{b}{c}y + \frac{1}{c}.$$

10. A computer-readable recording medium containing code providing an image processing method comprising the operations of:

mapping a two-dimensional plane of an input image into a three-dimensional vector surface;

calculating a coefficient with respect to an equation of a plane formed by a plurality of pixels mapped at the mapping operation; and interpolating by calculating a gray-level of a location to be interpolated based on the equation of the plane.

11. The computer-readable recording medium of claim 10, wherein the method further comprises the operations of:

classifying a surface formed by four pixels of the input image into a plane shape orthogonal to the Z-axis, a plane shape inclined to one direction, and a shape where the two planes make contact; and searching an edge direction of the surface formed by the four pixels when the surface formed by the four pixels, which is classified at the classifying operation, is where the two planes make contact, and the mapping operation maps the image based on the classified shape of the classifying operation and the edge direction of the searching an edge direction operation.

12. The computer-readable recording medium of claim 11, wherein the calculating a coefficient operation calculates the coefficient based on three coordinates $(x_0, y_0, z_0)$, $(x_1, y_1, z_1)$, $(x_2, y_2, z_2)$ on a same plane in accordance with the following equation of the plane:

$$ax+by+cz=1$$

where a, b, and c are coefficients, and $$a = \frac{|D_x|}{|D|}, b = \frac{|D_y|}{|D|}, c = \frac{|D_z|}{|D|}$$

$$D = \begin{pmatrix} x_0 & y_0 & z_0 \\ x_1 & y_1 & z_1 \\ x_2 & y_2 & z_2 \end{pmatrix}.$$

13. The computer-readable recording medium of claim 12, wherein the interpolating operation acquires the gray-level based on the coefficients a, b, and c acquired at the calculating a coefficient operation in accordance with the following equation:

$$z = -\frac{a}{c}x - \frac{b}{c}y + \frac{1}{c}.$$

14. An image processing method, comprising:

classifying a two-dimensional plane to be mapped formed by a plurality of pixels of an input image as one of a plane shape which is orthogonal to a Z-axis with respect to a surface formed by the plurality of pixels, a plane shape inclined to one direction, and a shape where two planes intersect;

determining an edge direction of the classified two-dimensional plane shape according to a level of intensity of the plurality of pixels of the classified two-dimensional plane and a gradient which is orthogonal to the edge direction;

mapping the input image as a function of the classified two-dimensional shape and the determined edge direction into a three-dimensional vector surface;

calculating a coefficient with respect to an equation of a plane formed by the mapped plurality of pixels; and interpolating by calculating a gray-level of a location to be interpolated based on the equation of the plane.

15. The method of claim 14, wherein the plurality of pixels is four pixels.

* * * * *